US010113314B2

(12) United States Patent
Humphreys

(10) Patent No.: US 10,113,314 B2
(45) Date of Patent: Oct. 30, 2018

(54) LIQUID RELEASE AGENT AND ASSOCIATED METHODS OF APPLICATION

(71) Applicant: TAMKO Building Products, Inc., Joplin, MO (US)

(72) Inventor: David Humphreys, Joplin, MO (US)

(73) Assignee: TAMKO Building Products, Inc., Josplin, MO (US)

( * ) Notice: Subject to any disclaimer, the term of this patent is extended or adjusted under 35 U.S.C. 154(b) by 174 days.

(21) Appl. No.: 14/622,855

(22) Filed: Feb. 14, 2015

(65) Prior Publication Data

US 2015/0239005 A1 Aug. 27, 2015

Related U.S. Application Data

(60) Provisional application No. 61/944,458, filed on Feb. 25, 2014.

(51) Int. Cl.

| | |
|---|---|
| ***B32B 3/10*** | (2006.01) |
| ***E04D 1/20*** | (2006.01) |
| *B05D 5/08* | (2006.01) |

(52) U.S. Cl.

CPC .................. *E04D 1/20* (2013.01); *B05D 5/08* (2013.01); *Y10T 428/31815* (2015.04)

(58) Field of Classification Search

None

See application file for complete search history.

(56) References Cited

U.S. PATENT DOCUMENTS

| | | | | |
|---|---|---|---|---|
| 3,813,280 | A * | 5/1974 | Olszyk et al. ............ | E04D 1/26 156/278 |
| 3,973,887 | A | 8/1976 | Breckenfelder | |
| 6,143,812 | A | 11/2000 | Martin et al. | |
| 6,506,444 | B1 | 1/2003 | Mahr et al. | |
| 7,977,259 | B2 | 7/2011 | Ratcliff et al. | |
| 2004/0127614 | A1 | 7/2004 | Jiang et al. | |

FOREIGN PATENT DOCUMENTS

| | | |
|---|---|---|
| EP | 0541311 A1 | 10/1992 |

* cited by examiner

*Primary Examiner* — Christopher M Polley
(74) *Attorney, Agent, or Firm* — Husch Blackwell LLP

(57) ABSTRACT

An asphalt shingle having an asphalt-coated substrate sheet with a top surface and a bottom surface, wherein a liquid release layer is applied on the bottom surface of the asphalt shingle instead of conventional backing particulates. The liquid release layer may help the shingle proceed through the manufacturing machinery without sticking and may prevent the adhesion of the bottom surface of the asphalt shingle to an adjacent shingle in a stack of shingles upon experiencing a pressure up to around four pounds per square inch, a temperature of around eighty degrees Celsius or below. The liquid release agent may also prevent adhesion of adjacent shingles in a stack at various temperature and pressures for at least fourteen days.

11 Claims, 5 Drawing Sheets

LIQUID RELEASE AGENT AND ASSOCIATED METHODS OF APPLICATION

CROSS-REFERENCE TO RELATED APPLICATION

This application claims the benefit of U.S. Provisional Patent Application No. 61/944,458 filed Feb. 25, 2014, the entire disclosure of which is hereby incorporated by reference.

FIELD OF THE INVENTION

This present invention relates to a liquid release agent to be applied to the bottom surface of an asphalt roofing shingle and methods for applying the liquid release agent on the shingle.

BACKGROUND OF INVENTION

Asphalt roofing shingles commonly used on commercial or residential structures are generally made in a known method which includes an asphalt coated substrate. During the manufacturing process, a substrate sheet or web is coated with hot asphalt before being processed through a series of rollers or drums that press and evenly apply the hot asphalt onto the substrate sheet. The substrate sheet or web may be any one known in the art or hereafter developed for asphalt roofing shingles, including a fiberglass mat, a polyester mat, or an organic paper mat, such as those made from materials such as recycled cardboard or paper, or a woven or non-woven mat made from a fibrous material such as cellulose fibers, synthetic fibers, mineral fibers and the like, or any mixture thereof. The substrate sheet is also typically coated with one or more layers of weathering materials to protect the roofing shingles from natural elements such as ultraviolet rays, rain, snow and the like and is then cooled. After cooling, the sheet is cut into a plurality of individual shingles of desired size and the individual shingles are then stacked in bundles for shipment.

Because the asphalt applied to the substrate sheet is both hot and sticky, it has a tendency to stick to the rollers and/or drums associated with the manufacturing equipment that coat and press the asphalt onto the substrate. As a result, prior to making contact with certain rollers and/or drums, an aggregate layer is normally applied to prevent the hot, sticky asphalt from sticking to or gumming up the rollers during the manufacturing process. Presently, roofing shingle manufacturers add colored granules to the front surface to protect the weathering side of the shingle and cheaper, non-sticking silicon particulates, such as sand or talc, to one side of the hot asphalt layer to prevent the substrate from sticking to the rollers. Using a granular aggregate backing particulate material like sand, talc, mica, coal slag fines, or volcanic ash has a significant downside as explained below.

Sand and other backing particulates are expensive, especially when purchased and used in high volume, as in the roofing shingle manufacturing process. Sand and other particulates are generally abrasive and penetrate the moving parts of the manufacturing equipment. The abrasive edges of the backing particulates cause serious wear and tear to the rollers, drums, gears and other mechanisms associated with the equipment. Repairing and replacing manufacturing equipment is expensive. Using sand and these other aggregate backing particulates also creates waste as more backing material is applied than necessary to ensure complete coverage of the surface. In addition, sand and other aggregate backing particulates potentially expose employees engaged in the manufacturing process to silica that may subject the employees to harmful health effects.

It is therefore desirable to develop a liquid release agent and methods for applying the same for use in the process of manufacturing roofing shingles wherein the liquid release agent and associated methods effectively prevent hot asphalt from sticking to rollers, drums and other surfaces used in the manufacturing process and likewise prevent the individual shingles from sticking to one another when stacked, stored, and/or shipped. Removing silica or sand from the manufacturing process will likewise improve employee working conditions and employee health and safety by making it easier to reduce or eliminate employee exposure to silica fines and dust. Further, removing silica, sand and the other backing particulates from the manufacturing process is likely to increase equipment reliability, sustainability, reduce maintenance costs and may reduce raw material volume and cost.

Accordingly, the present invention is directed to overcoming one or more of the problems as set forth above.

SUMMARY OF THE INVENTION

The manufacture of typical asphalt roofing shingles is well known in the art. The present invention eliminates the use of sand and other backing particulates and discloses the use of a liquid release agent applied to the back side of the shingle to prevent the asphaltic surface of the shingle from bonding with surfaces associated with the manufacturing equipment such as roller surfaces when the asphaltic surface comes into contact with such surfaces during the manufacturing process and may prevent the individual shingles from sticking to each other during stacking, storage and/or shipping of the shingles in bundles.

In the process by which roofing shingles are manufactured, a substrate sheet, typically made from a material such as fiberglass, enters the roofing shingle manufacturing equipment before being coated with hot, sticky asphalt. As the substrate sheet travels through the equipment, the substrate sheet is coated with asphalt and then travels through a series of rollers or drums where the asphalt is pressed, rolled, cooled and cut into individual sized shingles. The substrate sheet is also commonly referred to as a web. Presently in the art, particulate and/or granular material is applied to the top weathering surface and backing particulates such as sand, talc, mica, coal slag fines, or volcanic ash are applied to the bottom surface of the web on top of the asphalt coating and/or a reinforcing fabric or film applied to the bottom surface before the bottom surface touches a roller or other surface, the backing particulates preventing the asphalt on the bottom surface of the web from sticking to the rollers or other surfaces of the manufacturing equipment. In one embodiment, a reinforcing fabric or film may also be applied to the bottom surface of the asphalt coated web prior to or in place of the application of the backing particulates.

The present invention relates generally to use of a liquid release agent on asphalt roofing shingles to prevent sticking during the manufacturing and storage of the shingles, to reduce or eliminate the use of backing aggregate or particulate materials and correlative employee exposures to silica and nuisance dust, and to prevent wear and tear to the manufacturing equipment due to the use of aggregate backing materials. More specifically, the present invention relates to methods for applying a liquid release agent (in lieu of aggregate surfacing materials such as sand and talc) to the back side of shingles during the manufacturing process in order to reduce the degree to which the shingles stick to drums, rollers or other surfaces associated with the manufacturing equipment. Use of a liquid release agent and methods by which the agent is applied also may prevent shingles stacked in bundles from sticking to one another. Use of a liquid release agent may also eliminate employee exposure to silica and dust from backing aggregates.

The present invention replaces the backing aggregate or particulates applied to the bottom asphaltic and/or film/fabric coated surface of the shingle with a liquid release agent, such as an alkaline soap, silicone emulsion, wax (paraffin, carnauba, etc.), wax emulsions (acrylics, polyethylene, or polypropylene), synthetic polymer resins, oil emulsions, or other liquid release agent or water-based solution now known or hereafter developed. The liquid release agent may be applied before the bottom asphaltic and/or film/fabric coated surface of the web touches a roller or other surface and, more particularly, it may be applied after the point at which the asphaltic coating is applied to the bottom surface of the web, such as upon exiting the coater and before entering the cooling section but prior to the bottom surface of the web contacting any surface associated with the manufacturing process. In one embodiment of the present invention, the release agent is applied by way of a spray. The spray may be applied in a uniform, homogeneous application to the bottom surface of the web or alternatively, the spray may be applied in a non-homogeneous pattern such as in lanes, zones or sections. It is recognized and anticipated that the liquid release agent may take on many different formulations and that other agents including desired non-stick outcome are also envisioned.

In an alternative embodiment, the liquid release agent may be applied to the bottom asphaltic and/or film/fabric coated surface of the coated web using a roller instead of a spray application. In this embodiment, a roller located downstream in the manufacturing process sits and rotates at least partially in a liquid release agent bath. As the roller rotates, a portion of the roller is always present in the liquid release agent, thereby continuously coating the outer surface of the roller with the liquid release agent. Thus, the coated web contacts the outer surface of the roller coated with the liquid release agent as it passes over or under the roller, and the roller applies a layer of the liquid release agent to the bottom surface of the asphalt coating layer on the web.

After the liquid release agent is applied to the asphalt coating layer and/or film or fabric, the web sheet goes through a series of rollers that press the coated web into its final thickness. Additional layers of asphalt and other materials such as films, fabric and other granules can be applied on the coated web to make it more durable, flexible and resistant to natural elements.

The present method may also include a second application of the liquid release agent applied subsequent to either of the aforementioned processes. In the second application, the liquid release agent is intended to prevent individual shingles from sticking to one another when they are cut and stacked for packaging and shipment. In one embodiment, the second application can take place after the web has been totally processed and subsequent or prior to cutting the web into individual, pre-sized shingles, but prior to stacking. This second application of liquid release agent preferably occurs prior to the web entering the cutting rollers, but could occur after the shingles are cut.

In the second application, the liquid release agent can be again applied in a spray application or by a roller where the application pattern is an even homogeneous application, or alternatively, the agent can be applied by a spray or roller application in a non-homogeneous pattern such as in zones, lanes or sections. By applying the liquid release agent prior to cutting the web, when individual roofing shingles are subsequently stacked for packaging, storage or shipping, the individual shingles will not stick to one another. In addition, application points may be disposed after the cutter. For example, to improve the liquid release coverage on the shingles.

In one embodiment, the applied liquid release agent is capable of preventing shingles from adhering together under a number of environmental conditions including exposure to a pressure of nearly zero up to around four (4) pounds per square inch, and at temperatures of around eighty (80) degrees Celsius or below, or any combination of the aforementioned pressures and temperatures.

Other aspects and advantages of the present invention will be apparent from the following detailed description of the preferred embodiments and the accompanying drawing figures.

BRIEF DESCRIPTION OF DRAWINGS

The accompanying drawings form a part of the specification and are to be read in conjunction therewith, in which like reference numerals are employed to indicate like or similar parts in the various views.

DETAILED DESCRIPTION

The following detailed description of the present invention references the accompanying drawings that illustrate specific embodiments in which the invention can be practiced. The embodiments are intended to describe aspects of the present invention in sufficient detail to enable those skilled in the art to practice the invention. Other embodiments can be utilized and changes can be made without departing from the spirit and scope of the present invention. The present invention is defined by the appended claims and, therefore, the description is not to be taken in a limiting sense and shall not limit the scope of equivalents to which such claims are entitled.

Figure 1:
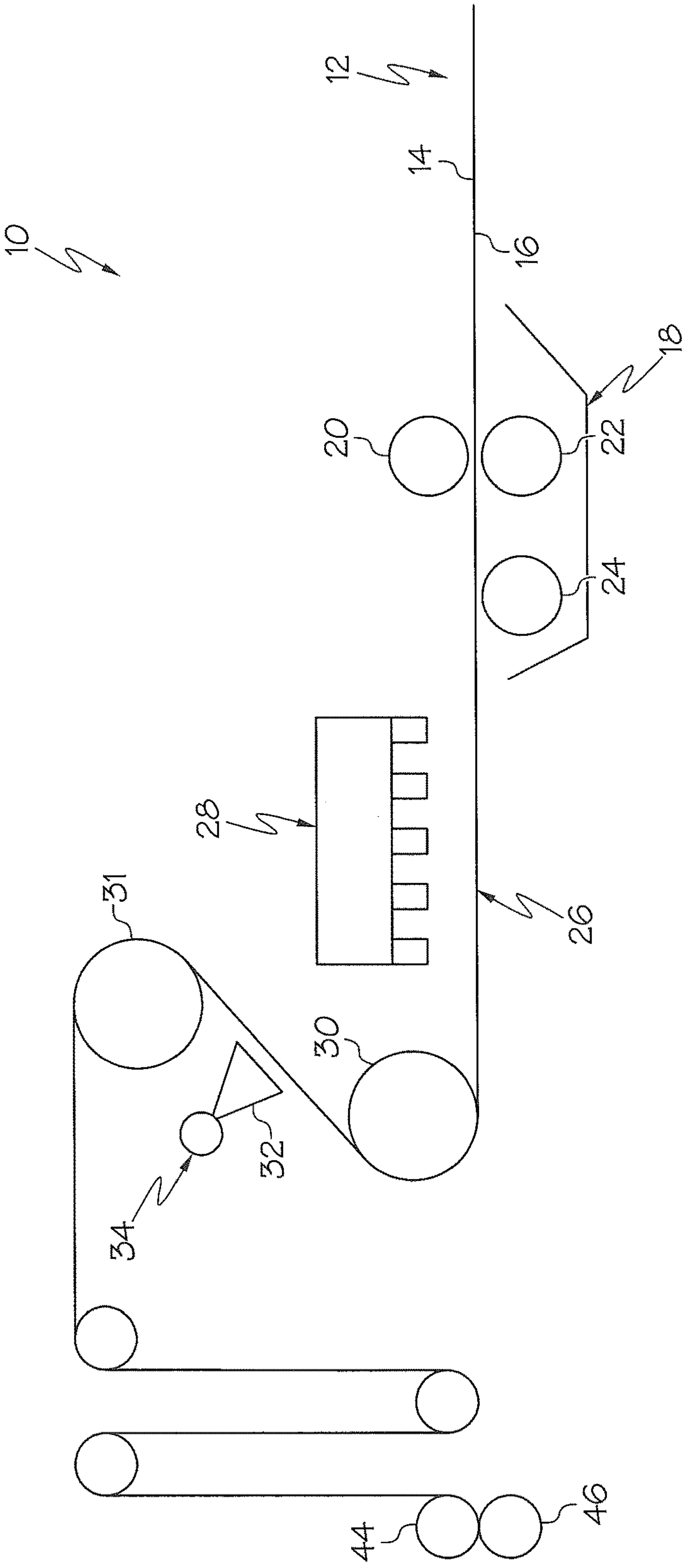
FIG. 1 is a partial schematic representation of equipment for manufacturing roofing shingles, the equipment arranged for a process of making roofing shingles which includes the application of a liquid release agent according to the teachings of the present invention.

FIG. 1 illustrates a schematic representation of the manufacturing equipment and process 10 for making roofing shingles. The equipment and process 10 uses methods known in the art to manufacture roofing shingles but further incorporates the present invention into the equipment and process 10. Although the manufacturing process 10 illustrated herein FIGS. 1, 4 and 5 may not be representative of the entire process, such processes are sufficient to describe the present invention. In the process 10 illustrated in FIG. 1, a substrate sheet 12 enters the overall apparatus to be coated with hot asphalt. The substrate 12 includes a top surface 14 which is typically coated with a plurality of granular and/or bituminous materials commonly known in the art, wherein the granular and bituminous materials protect the shingle, and consequently the roof, from the physical damage that can be caused by natural occurrences including ultraviolet rays, rain, snow, wind and other elements. The top surface 14 is also known in the art and referred to herein as the exposed surface 14. The surface opposite the exposed top surface 14 is the bottom surface 16 and this is the surface that lies adjacent to the roof surface. The bottom surface 16 is also known in the art and referred to herein as the unexposed surface 16.

The substrate sheet 12 may be composed of any material known in the art or hereafter developed for asphalt roofing shingles, including a fiberglass mat, a polyester mat, or an organic paper mat, such as those made from materials such as recycled cardboard or paper, or a woven or non-woven mat made from a fibrous material such as cellulose fibers, synthetic fibers, mineral fibers and the like, or any mixture thereof. Upon entering the coater 18, hot asphalt is applied to the top of the substrate sheet 12, and the substrate sheet 12 then travels through a pair of top/bottom measuring rollers 20 and 22. In this regard, the asphalt coating may be any asphalt type or mixture known in the art, such as any bituminous material suitable for use as a roofing material, such as asphalts, tars, pitches and mixtures thereof. The measuring rollers 20 and 22 act to ensure that the substrate sheet 12 is of appropriate thickness before being coated by the back coating roller 24. The back coating roller 24 coats the bottom surface 16 of the substrate sheet 12 with hot asphalt. In addition, the asphalt coating may include various additions and/or modifiers such as inorganic fillers, mineral stabilizers, organic materials including polymers and so forth. Once the substrate sheet 12 is coated with asphalt, the substrate sheet 12 is can also be referred to as a coated web 26. While FIG. 1 illustrates one means of applying hot asphalt to the bottom surface 16, it should be appreciated that other methods and processes for such application such as immersion coating, spray application, extrusion coating and the like may be employed when coating the substrate sheet 12 with hot asphalt.

After the hot asphalt is applied, the web 26 moves through a process wherein a blender 28 containing top-surface granules applies a granular surface coating to the top surface 14 of the web 26. The top-surface granules are commonly known in the art and they serve a number of functions including giving the shingles their distinctive appearance, and protecting the asphalt coating from the elements and UV damage. In some instances, a reinforcing film, fabric or layer may also be applied to the bottom surface of the coated web.

At this point in the prior art manufacturing process, a particulate such as sand or talc would normally be applied to the bottom surface 16 of the web 26 in order to prevent the bottom surface 16 from sticking to rollers, drums or other equipment surfaces downstream in the manufacturing process such as the top S-drum 31 illustrated in FIG. 1. The backing particulate also adds weight to the finished shingles. Because of the aforementioned detrimental consequences when sand or other particulates are used to prevent the bottom surface 16 from sticking to a roller or other downstream surface, the present invention incorporates a liquid release agent 32 that is applied to the bottom surface 16 of the web 26 instead of the backing particulate to accomplish this task. Liquid release agent 32 may be an alkaline soap, silicone emulsion, wax (paraffin, carnauba, etc.), wax emulsions (acrylics, polyethylene, or polypropylene), synthetic polymer resins, oil emulsions, or other liquid release agent or water-based solution now known or hereafter developed. In a preferred embodiment, the liquid release agent 32 applied to the bottom surface 16 is an alkaline soap, silicone emulsion, or other water-based solution. In one embodiment, the soap, emulsion or other solution may include a range of solids in percent emulsion therein in the range from about 1% to about 40%.

The liquid release agent may be any industrial alkaline soap having basic properties and an ability to prevent the coated surface of the web from having a high affinity to bond with a roller or other surface associated with the manufacturing equipment. In one embodiment, the liquid release agent is an alkaline soap made by combining lye and an oil. In a preferred embodiment, the lye is potassium hydroxide, which is potash, and the oil is coconut oil.

Figure 2:
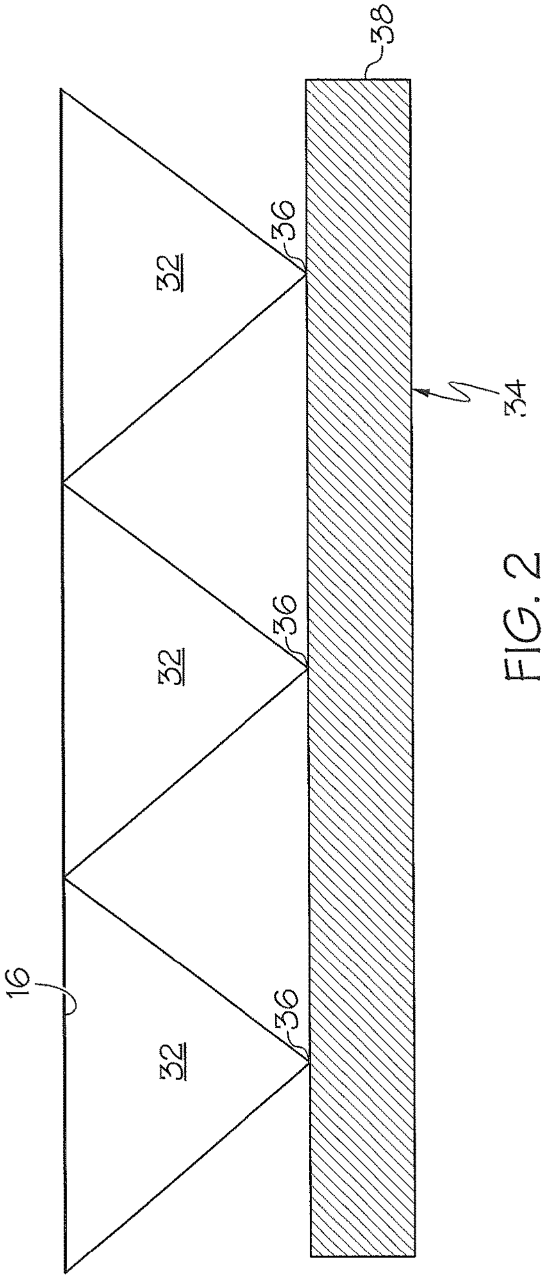
FIG. 2 illustrates a side elevation view of one embodiment of a spray nozzle arrangement for use in the equipment of FIG. 1 for applying a homogeneous application of the liquid release agent across a bottom surface of a coated web.
Figure 3:
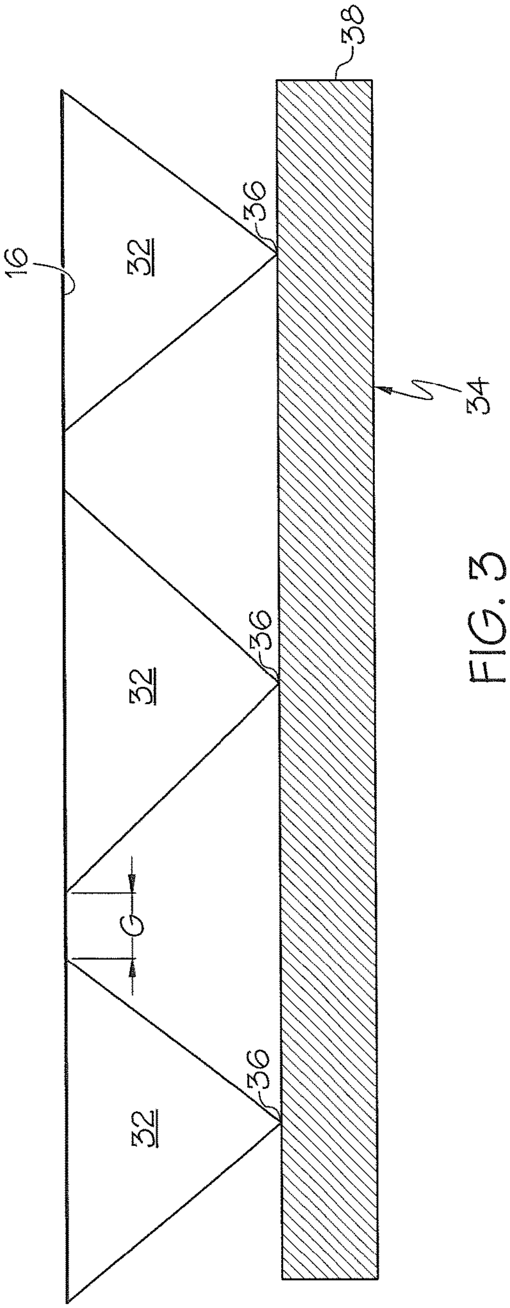
FIG. 3 illustrates a side elevation view of another embodiment of a spray nozzle arrangement for use in the equipment of FIG. 1 for applying a non-homogeneous application of the liquid release agent across a bottom surface of a coated web.

In the embodiment illustrated in FIG. 1, the liquid release agent 32 is applied via a spray mechanism such as a sprayer 34. FIG. 2 illustrates one application pattern in which the sprayer 34 may apply the liquid release agent 32 to the bottom surface 16, while FIG. 3 illustrates an alternative application pattern in which the sprayer 34 may apply the liquid release agent 32 to the bottom surface 16. In both embodiments, the sprayer 34 includes one or more nozzles 36 housed in a spray bar or spray manifold 38 associated with sprayer 34. In the application illustrated in FIG. 2, nozzles 36 of sprayer manifold 38 are positioned and located so as to apply the liquid release agent 32 in an even, homogeneous manner. By applying the liquid release agent 32 homogeneously, the bottom surface 16 of the web 26 will be completely and entirely coated with the liquid release agent 32.

In the alternative embodiment illustrated in FIG. 3, the nozzles 36 of sprayer manifold 38 are positioned and located so as to apply the liquid release agent 32 in a non-homogeneous manner across the bottom surface 16 of the web 26 such as in lanes, sections, dots, zones or other such patterns. As an example, the spray pattern in FIG. 3 of adjacent release agent 32 applications may be separated by a gap G as shown. In doing so, the bottom surface 16 of web 26 will include a sufficient amount of the liquid release agent 32 to prevent the bottom surface 16 from sticking to a downstream roller or other surface of the manufacturing equipment, while not coating the entire bottom surface 16 with the agent 32, thus avoiding coating certain segments of the bottom surface as desired and possibly adding additional economy or providing one or more desired patterns of exposed portions of the coated web. As illustrated in FIG. 3, the bottom surface 16 is not completely coated with agent 32.

Figure 4:
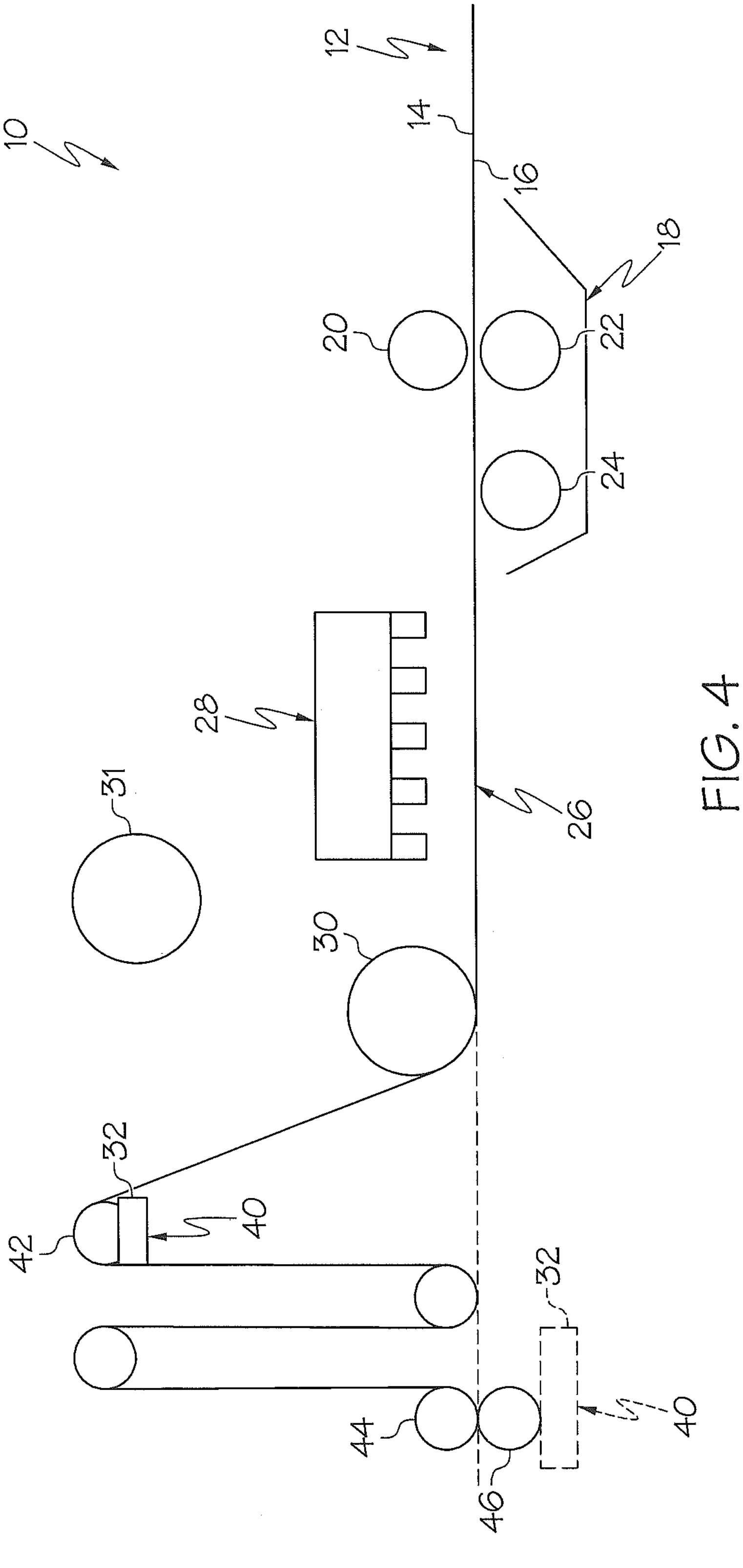
FIG. 4 is a partial schematic representation of another embodiment of the arrangement of equipment used to manufacture roofing shingles, the equipment the equipment arranged for a process of making roofing shingles which includes the application of a liquid release agent using a roller according to the teachings of the present invention.

In a separate alternative embodiment as illustrated in FIG. 4, the release agent 32 need not be applied via a spray application, but instead, it can be applied by means of a roller 42 in a liquid bath 40 of liquid release agent 32. In this embodiment, the liquid bath 40 is located downstream from the bottom S-drum 30 and the bath 40 is positioned and located such that a portion of a downstream roller 42 always is submerged in the liquid bath 40. Thus, as the roller 42 rotates and completes its circular motion, it passes into and out of the bath 40 thus coating the exterior roller surface with the liquid release agent 32. As the bottom surface 16 of web 26 travels across the top portion of roller 42, the liquid release agent 32 is applied to the bottom surface 16 of web 26 by contact with the roller's outer surface. This process is cyclical and because at least a portion of the circumference of the roller 42 is continuously submerged in the bath 40 and as the roller 42 rotates, the coated outer surface of the roller 42 continuously coats the bottom surface 16 of the web 26 with the liquid release agent.

It is also recognized and anticipated that the liquid bath 40 does not necessarily have to be positioned at roller 42. In an alternative embodiment, liquid bath 40 may be positioned at any roller downstream from coater 18 in the manufacturing process as long as the bottom surface 16 is coated before it makes contact with any roller or other surface. In this regard, note that the process illustrated in FIG. 4 has the web 26 bypassing the top S-drum 31 and, instead, the web 26 is fed directly to roller 42. Still further, an alternative web path is shown in FIG. 4 using dashed lines, which includes the web 26 being fed directly from the bottom S-drum 30 to the top and bottom press rollers 44 and 46 and the liquid bath 40 can be associated with the bottom press roller 46. Still other process configurations are anticipated and envisioned so long as the liquid release agent 32 is applied, via spray or bath, before any contact of the coated bottom surface 16 to any roller or other surface associated with the manufacturing equipment.

Figure 5:
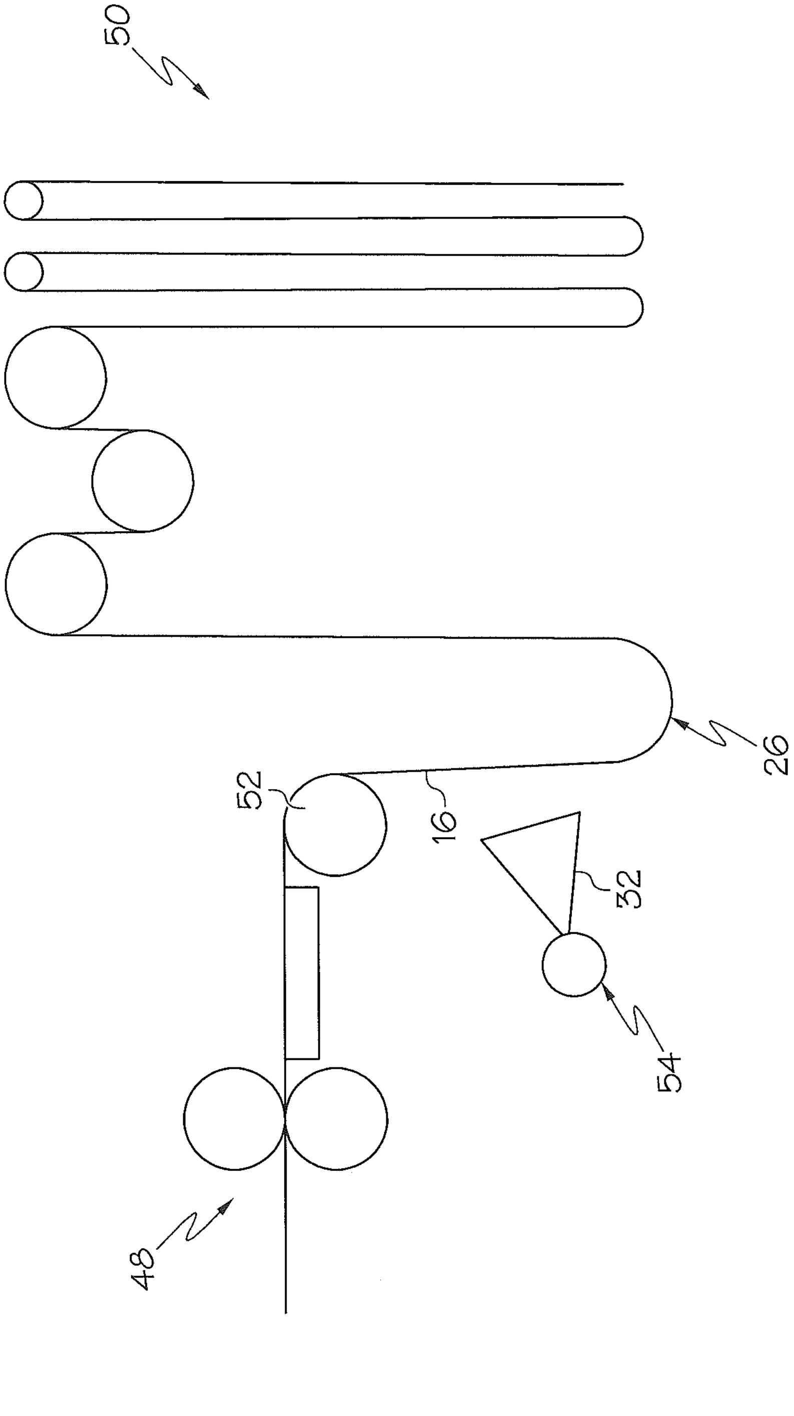
FIG. 5 is a partial schematic representation of another embodiment of equipment used to manufacture roofing shingles, the equipment arranged for a process of making roofing shingles which includes a second application of a liquid release agent at a second location.

In another embodiment of the present invention, subsequent to the initial application of the liquid release agent 32 to the bottom surface 16 of the web 26, either by the spray application or by liquid bath application, the liquid release agent 32 may be applied for a second time prior to the web 26 being cut into individual shingles. In this embodiment, the purpose of the second application is to prevent the individual cut shingles from sticking to each other when packaged in bundles for shipment. This embodiment is illustrated in FIG. 5 as explained below. It is also contemplated that this invention will require only a single application.

FIG. 5 is a partial schematic representation of the end portion of the manufacturing process illustrating the cutting rollers 48. The shingle may have already been processed through all coating and/or laminating stations for the particular asphalt shingle. After being processed through a plurality of drums, coaters, and/or rollers to prepare the web 26 to include the surfaces necessary to function as a roofing shingle, the web 26 may be cooled in cooling section 50 before entering the cutting rollers 48. Also, before entering the cutting rollers 48, such as just prior to the cutting guide roller 52, the liquid release agent 32 may be applied for a second time. This second application may be a spray application wherein a sprayer 54, substantially similar to the sprayer 34, applies the liquid release agent 32 to the bottom surface 16 of the web 26. As before, the application by the sprayer 54 may be homogeneous as illustrated in FIG. 2, or it may be non-homogeneous as illustrated in FIG. 3. It should be appreciated that the second application may likewise alternatively be a liquid bath application, similar to that described herein with respect to FIG. 4. It should also be noted that applications of the liquid release agent 32 after the first application may likewise take place at alternative or additional locations during the manufacturing process, such as after the cutting process, but prior to stacking the individual shingles. Moreover, the embodiment described above utilizes the same liquid release agent at both applications. However, different release agent formulations or materials may be utilized at the first and second application and performance may be increased through routine experimentation or trial and error.

After the liquid release agent 32 is applied to the bottom surface 16 of web 26, web 26 may be cut and packaged for shipping and storage. When the resultant individual shingles are shipped and stored, they are typically in a stacked arrangement. Environmental conditions experienced by the stacked shingles during storage and shipping have been noted to affect whether adjacent shingles in a stack adhere to each other after stacking. This is likely due to the fact that the asphalt, while a solid at most atmospheric environmental conditions, may become more fluid under certain pressures and/or temperatures or combinations thereof. In addition, the asphalt in the shingle may experience creep or flow when subject to certain pressures or temperatures over certain time durations. In one embodiment of the present invention, the second application of agent 32 to the bottom surface 16 described above may be formulated to render the shingles less likely to stick to each other when stacked and stored under certain environmental conditions.

Figure 6:
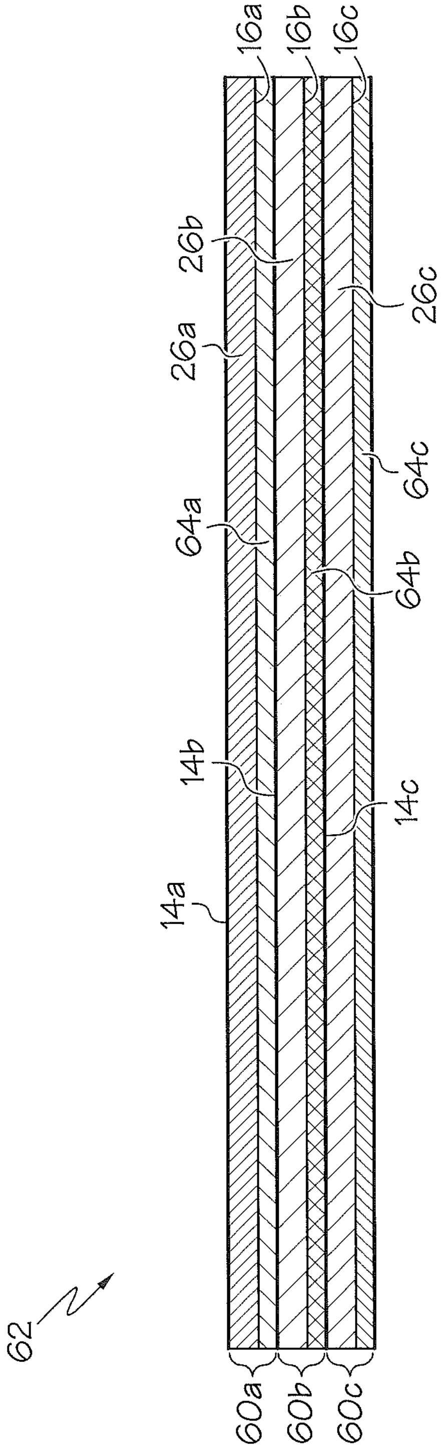
FIG. 6 is an end view of a stack of shingles manufactured according to the teachings of the present invention.

FIG. 6 illustrates a plurality of individual shingles 60*a*, 60*b*, and 60*c* in a stack 62 or stacking arrangement. As shown in FIG. 6, individual shingles 60*a*, 60*b*, and 60 have the same construction and comprise a respective web layer 26*a*, 26, and a layer 64 of liquid release agent 32. In one embodiment, the combined application of the layer 64 liquid release agent 32 is applied in a way which respective adjacent shingles 60*a*, 60*b*, and 60*c* in stack 62 resist adhering to each other under certain defined environmental conditions. For example, in one embodiment, the layer 64*b* the liquid release agent 32 is sufficient to prevent adhesion between an individual shingle 60*b* to an adjacent shingle 60*c* in stack 62 when exposed to a pressure of nearly zero up to around four (4) pounds per square inch. Similarly, the temperature at which shingles 60*a*, 60*b*, and 60*c* in stack 62 are stored also influences whether shingles 60*a*, 60*b*, and 60*c* in stack 62 will adhere through the respective separating layer 64 of liquid release agent 32. In one embodiment, the layer 64 of liquid release agent 32 prevents the adhesion of shingles 60*a*, 60*b*, and 60*c* in stack 62 exposed to a temperature of around eighty (80) degrees Celsius or below.

In addition to the above physical conditions individually, an embodiment of the liquid release agent 32 prevents adhesion between adjacent shingles 60*a*, 60*b*, and 60*c* in stack 62 in any combination of the above ranges. Thus, for example, an embodiment of liquid release agent 32 prevents adhesion between adjacent shingles 60*a*, 60*b*, and 60*c* in stack 62 when the shingles 60*a*, 60*b*, and 60*c* are stacked and stored, being exposed to a pressure up to around four (4) pounds-per-square-inch and a temperature of around eighty (80) degrees Celsius or below. In one embodiment, release agent 32 may prevent adhesion between adjacent shingles 60*a*, 60*b*, and 60*c* in stack 62 for at least fourteen (14) days. In a workable embodiment, the layer 64 of liquid release agent 32 prevents adhesion between individual shingle 60*b* an adjacent shingle 60*c* when exposed to a pressure of up to around three and six-tenths (3.6) pounds-per-square-inch, when exposed to a constant temperature of around seventy (70) degrees Celsius or below for at least fourteen (14) days.

It is also recognized and anticipated that the present manufacturing process and methods for applying a liquid release agent to the bottom surface of a substrate web material can be utilized with the manufacturing of any type of roofing shingle such as high impact resistant shingles and the like. It is also recognized that a fabric material, films, and other materials and coatings can be applied to both sides of the substrate sheet to achieve any desired final shingle product. It is also recognized that other spraying apparatus or other fluid application apparatus may likewise be utilized to apply the present liquid release agent other than those methods disclosed herein.

From the foregoing, it will be seen that this invention is one that is well adapted to attain all the goals and objects hereinabove set forth together with other advantages which are obvious and which are inherent to the equipment and methods disclosed herein. It will be understood that certain features and sub-combinations are of utility and may be employed without reference to other features and sub-combinations. This is contemplated by and is within the scope of this disclosure. Since many possible embodiments of the invention may be made without departing from the spirit and scope thereof, it is also to be understood that all disclosures set forth herein or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present equipment and method will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An asphalt shingle comprising:

a substrate sheet having a top surface and a bottom surface, the substrate sheet being coated with asphalt on at least one of the top surface or the bottom surface;

a first dispersed solid release layer on the bottom surface resulting from the dispersion and evaporation of a first liquid release layer, wherein said first liquid release layer is applied to the bottom surface;

a second dispersed solid release layer on the bottom surface resulting from the dispersion and evaporation of a second liquid release layer applied to said bottom surface, wherein the first dispersed release area only partially covers the bottom surface at the time the second dispersed release layer is applied.

2. The asphalt shingle of claim 1 wherein the second liquid release layer comprises a water-based solution or emulsion having a percentage of solids in a range from about one percent to about forty percent.

3. The asphalt shingle of claim 1 wherein the second dispersed solid release layer is operable to prevent adhesion between the bottom surface of the shingle and an adjacent shingle in a stacked arrangement at an applied pressure up to around four pounds per square inch.

4. The asphalt shingle of claim 1 wherein the second dispersed solid release layer is operable to prevent adhesion between the bottom surface of the shingle and an adjacent shingle in a stacked arrangement for at least fourteen days.

5. The asphalt shingle of claim 1 wherein the second dispersed solid release layer is operable to prevent adhesion between the bottom surface of the shingle and an adjacent shingle in a stacked arrangement at a temperature of around seventy degrees Celsius or below.

6. An asphalt shingle comprising:

a substrate sheet having a top surface and a bottom surface, the substrate sheet being coated with asphalt on at least one of the top surface or the bottom surface;

a first release layer disposed on the bottom surface, the release layer resulting from the dispersion and evaporation of moisture from a first liquid release layer applied to at least one of the top surface or the bottom surface;

a second release layer disposed on the entirety of the bottom surface, the second release layer resulting from the dispersion and evaporation of moisture from a second liquid release layer applied to at least one of the top surface or the bottom surface, the second release layer preventing the adhesion of the bottom surface of the asphalt shingle to another shingle in a stacked arrangement upon experiencing a pressure up to around four pounds per square inch and at a temperature of around seventy degrees Celsius or below; and wherein the first dispersed release layer is applied to the bottom surface and the first dispersed release area only partially covers the bottom surface at the time the second dispersed release layer is applied.

7. The asphalt shingle of claim 6 wherein the second release layer prevents adhesion of the bottom surface of the asphalt shingle to another shingle for at least fourteen days.

8. The asphalt shingle of claim 6 wherein the second liquid release layer is a water-based solution or emulsion having a percentage of solids in a range from about one percent to about forty percent.

9. The asphalt shingle of claim 6 wherein the second release layer prevents the adhesion of the bottom surface of the asphalt shingle to another shingle in a stacked arrangement upon experiencing a pressure up to at least four pounds per square inch and at a temperature of around seventy degrees Celsius or below.

10. The asphalt shingle of claim 6 wherein the second liquid release layer is a water-based solution or emulsion having a percentage of solids that is at least forty percent.

11. An asphalt shingle comprising:

a substrate sheet having a top surface and a bottom surface, the substrate sheet being coated with asphalt on at least one of the top surface or the bottom surface;

a first release layer disposed on the bottom surface, the release layer resulting from the dispersion and evaporation of moisture from a first liquid release layer applied to at least one of the top surface or the bottom surface;

a second release layer disposed on the entirety of the bottom surface, the second release layer resulting from the dispersion and evaporation of moisture from a second liquid release layer applied to at least one of the top surface or the bottom surface, the second release layer preventing the adhesion of the bottom surface of the asphalt shingle to another shingle in a stacked arrangement upon experiencing a pressure up to around four pounds per square inch and at a temperature of around seventy degrees Celsius or below; and wherein the first dispersed release layer is non-homogeneous across the bottom surface.

* * * * *